United States Patent [19]

Watson et al.

[11] Patent Number: 4,706,244

[45] Date of Patent: Nov. 10, 1987

[54] FREQUENCY MULTIPLEXED TELEPHONE SYSTEM

[75] Inventors: George A. Watson, Fullerton; Ramon S. Co, El Toro; James L. Fuhrman, Tustin; Frank Avella, Irvine, all of Calif.

[73] Assignee: Rockwell International Corporation, El Segundo, Calif.

[21] Appl. No.: 692,597

[22] Filed: Jan. 15, 1985

[51] Int. Cl.⁴ .............................................. H04J 1/02
[52] U.S. Cl. .................................. 370/69.1; 370/71; 370/74; 379/160; 379/202; 379/206
[58] Field of Search .................... 370/69.1, 71, 74, 79; 179/81 R, 2 BC, 27 G, 2.51, 18 AD, 18 BC; 379/159, 160, 202, 206, 225, 237

[56] References Cited

U.S. PATENT DOCUMENTS

| | | | |
|---|---|---|---|
| 3,202,765 | 8/1965 | Byrne | 455/46 |
| 3,864,521 | 2/1975 | DeLong et al. | 370/71 |
| 3,931,477 | 1/1976 | Warman | 179/18 AD |
| 4,020,288 | 4/1977 | Bellanger et al. | 370/74 |
| 4,087,639 | 5/1978 | Beene et al. | 370/74 |
| 4,503,289 | 3/1985 | Spires | 179/18 FA |

Primary Examiner—Robert L. Griffin
Assistant Examiner—Elissa Seidenglanz
Attorney, Agent, or Firm—H. Fredrick Hamann; George A. Montanye; David J. Arthur

[57] ABSTRACT

A frequency multiplexed system for coupling a plurality of individual telephone sets to at least one subscriber telephone line. The system includes a line adapter unit for controlling use of subscriber lines and for assigning the use of frequency bands to the individual telephone sets. The system includes a two-conductor interconnection cable for coupling to each of the telephone sets and to the line adapter unit. The system has a power-down mode in which the loss of external power allows each of the individual telephone sets to use the subscriber line. The line adapter unit and each of the individual telephone sets employ transconductance amplifiers so that modulated current signals are produced on the interconnection cable, thus allowing a plurality of voice signals to be summed together by voltage addition for conferencing between the telephone sets and the subscriber lines. One embodiment of the invention includes the production of a pilot reference signal on the interconnection cable by the adapter unit so that synchronous modulation and demodulation by each of the telephone sets is made possible.

16 Claims, 6 Drawing Figures

FREQUENCY MULTIPLEXED TELEPHONE SYSTEM

BACKGROUND OF THE INVENTION

In general, modern homes are provided with telephone service by a telephone company which provides a subscriber line drop to the subscriber's house. In such a conventional system, one or more individual telephone sets may be connected to the subscriber line in parallel, as individual extension sets, so that each of the individual sets may communicate on the line. The telephone sets are generally connected together with a common cable extending from the subscriber line and having at least two conductors.

A problem with the common residential telephone system is that intercom telephone communication between the various telephone sets on a subscriber line drop is generally not possible. Although conference calls are possible by having each user at a different one of the extension telephone sets, it is generally not possible to use the ringing features of telephone sets to set up such conference calls.

Of late, it has become more common for houses to be equipped with more than one subscriber telephone line. The simplest way to arrange such systems in which multiple subscriber lines are provided is to provide entirely separate wiring and telephone sets for each of the subscriber lines; thus, effectively isolating each subscriber line and its associated telephone sets from each of the other lines and their sets. A problem with such a system which is separated into independent parts is that wasteful duplication of telephone sets may result, and the conferencing of telephone calls between more than one subscriber line is generally not possible. Another problem with such a separated arrangement is that separate sections of interconnection wiring must be added to the house each time that an additional subscriber line is installed.

SUMMARY OF THE INVENTION

It is therefore an object of the invention to provide a telephone system for installation using conventional two-conductor interconnection wiring, in which the system provides for intercom calls between the telephone sets used in the system.

Another object of the invention is to provide a telephone system for installation using conventional two-conductor interconnection wiring, in which the system allows access by a plurality of telephone sets to a plurality of subscriber lines.

A further object of the invention is to provide a telephone system which provides for conferencing between at least two subscriber telephone lines.

Another object of the invention is to provide a telephone system for coupling a plurality of telephone sets to a plurality of subscriber lines, and having a power failure mode such that the loss of external electrical power will allow the individual telephone sets and subscriber lines to operate as a conventional telephone system.

A frequency multiplexed telephone system is provided in which a line adapter unit is coupled to one or more telephone company subscriber lines, and in which a plurality of individual telephone sets are coupled to an interconnection cable which is also coupled to the line adapter unit. The interconnection cable is frequency multiplexed so that individual frequency channels are allocated to each of the subscriber telephone lines. Also, frequency channels are provided on the interconnection cable for a channel which allows polling and control by the line adapter unit. Using this polling and control channel, the line adapter unit can monitor the status of each of the plurality of telephone sets by sending out polling requests and control signals to determine the status and control the operation of each telephone set. A polling response channel is provided on the interconnection cable in order to allow each telephone set to transmit status information onto the interconnection cable when polled by the line adapter unit. An intercom channel is provided on the interconnection cable for intercom conversations between individual telephone sets. In one embodiment of the invention, a pilot reference channel is provided on the interconnection cable so that the line adapter unit and each of the individual telephone sets may frequency and phase synchronize themselves to the pilot reference channel and thus allow use of synchronous modulation and demodulation. The line adapter unit and each of the telephone sets are equipped with transconductance amplifiers for placing current modulated signals on the interconnection cable such that conferencing is possible between more than one telephone set and between the line adapter unit and the telephone sets. Such conferencing is made possible by the process of current addition due to the operation of the transconductance amplifiers on the interconnection cable. The line adapter unit and each of the telephone sets is equipped with power-down bypass circuitry such that upon loss of electrical supply power, the line adapter unit and each of the telephone sets will no longer be frequency multiplexed but will operate as a conventional telephone system.

DESCRIPTION OF THE PREFERRED EMBODIMENT

Figure 1:
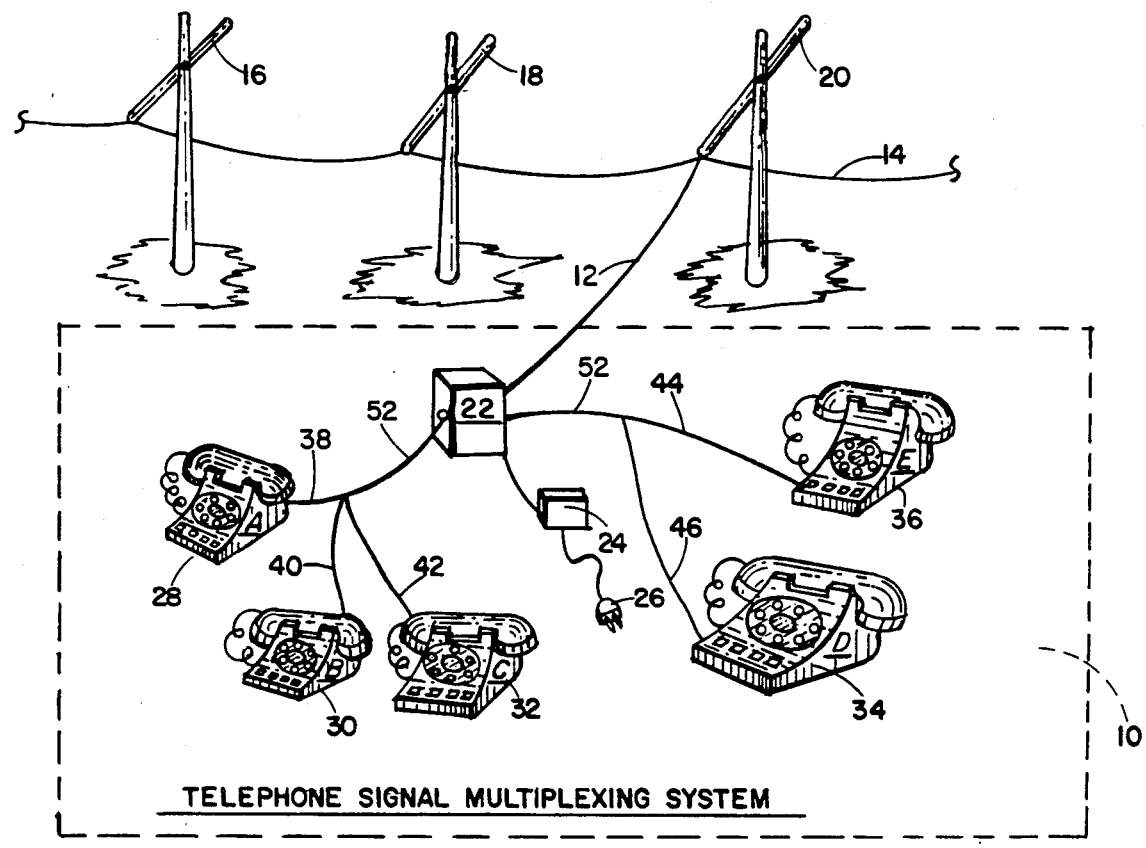
FIG. 1 is a symbolic, pictorial drawing showing the frequency multiplexed telephone system of this invention as connected to a subscriber line provided by a telephone company.

Referring first to FIG. 1, the frequency multiplexed telephone system 10 is coupled through a subscriber line cable drop 12 to a telephone line 14 which is provided by a telephone company. The line 14 is typically suspended from telephone poles 16, 18, and 20. The subscriber line cable drop 12 is typically provided for connecting a residential house to the international public telephone system. The subscriber drop 12 may include one or more subscriber line pairs which would allow separate conversations on each of the subscriber line pairs.

The frequency multiplexed telephone system 10 is for use inside a reidential house (not shown) or the like in order to provide convenient access to telephone service. The telephone system 10 is self controlling, and does not require control by the telephone company.

The telephone system 10 includes a line adapter unit 22 which is equipped with a transformer 24 and a power plug 26 for connection to an external power source, such as the conventional alternating current power provided by power companies to houses. The system 10 includes a plurality of telephone sets 28, 30, 32, 34, and 36 which are labeled with the letters A-E. An interconnection cable consisting of the cable sections 38, 40, 42, 44, and 46 extends between the line adapter unit 22 and each of the telephone sets A-E.

Figure 2:
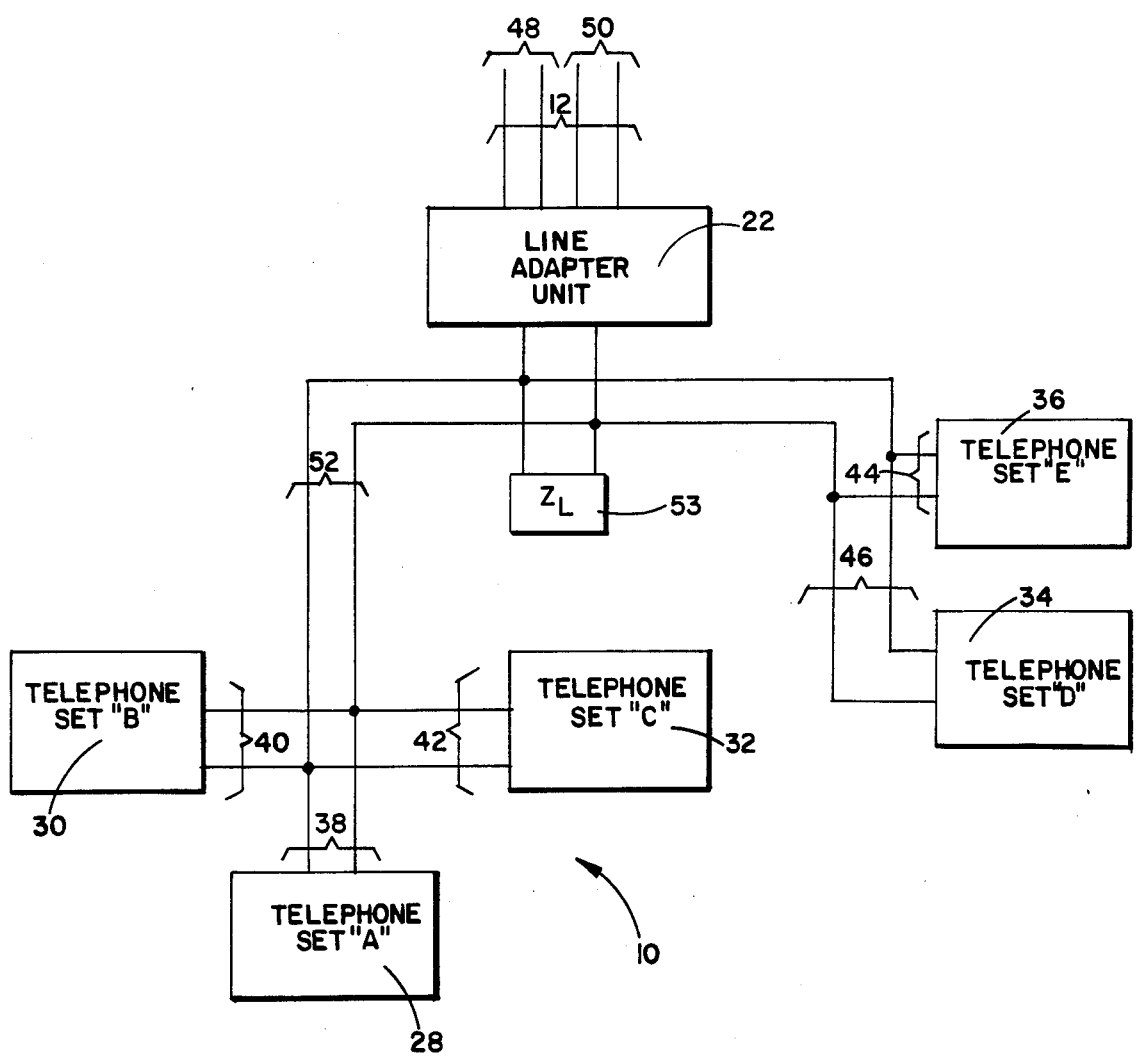
FIG. 2 is a block diagram of the frequency multiplexed telephone system of this invention.

Referring next to FIG. 2, the system 10 is connected to the subscriber line drop 12 which may have two subscriber line conductor pairs 48 and 50. Although the preferred embodiment for the system 10 shown herein is constructed for operation with either one or two subscriber lines (such as the subscriber lines 48 and 50), similar systems may be constructed for use with more than two subscriber lines. The interconnection cable pair 52 extends in parallel between the line adapter unit 22 and each of the telephone sets A-E, through the cable sections 38, 40, 42, 44, and 46. The interconnection cable pair 52 may consist of two conductive wires identical in construction to cabling used with conventional telephone systems. Therefore, the telephone system 10 may be installed in a residential house having conventional telephone cabling in place, so that the interconnection cabling 52 is the same cabling as previously used with a conventional system, and no additional cabling need be provided when the system 10 is installed to replace a conventional telephone system. A load impedance 53 is shown connected across the input-/output leads 52 of line adapter 22.

Figure 3:
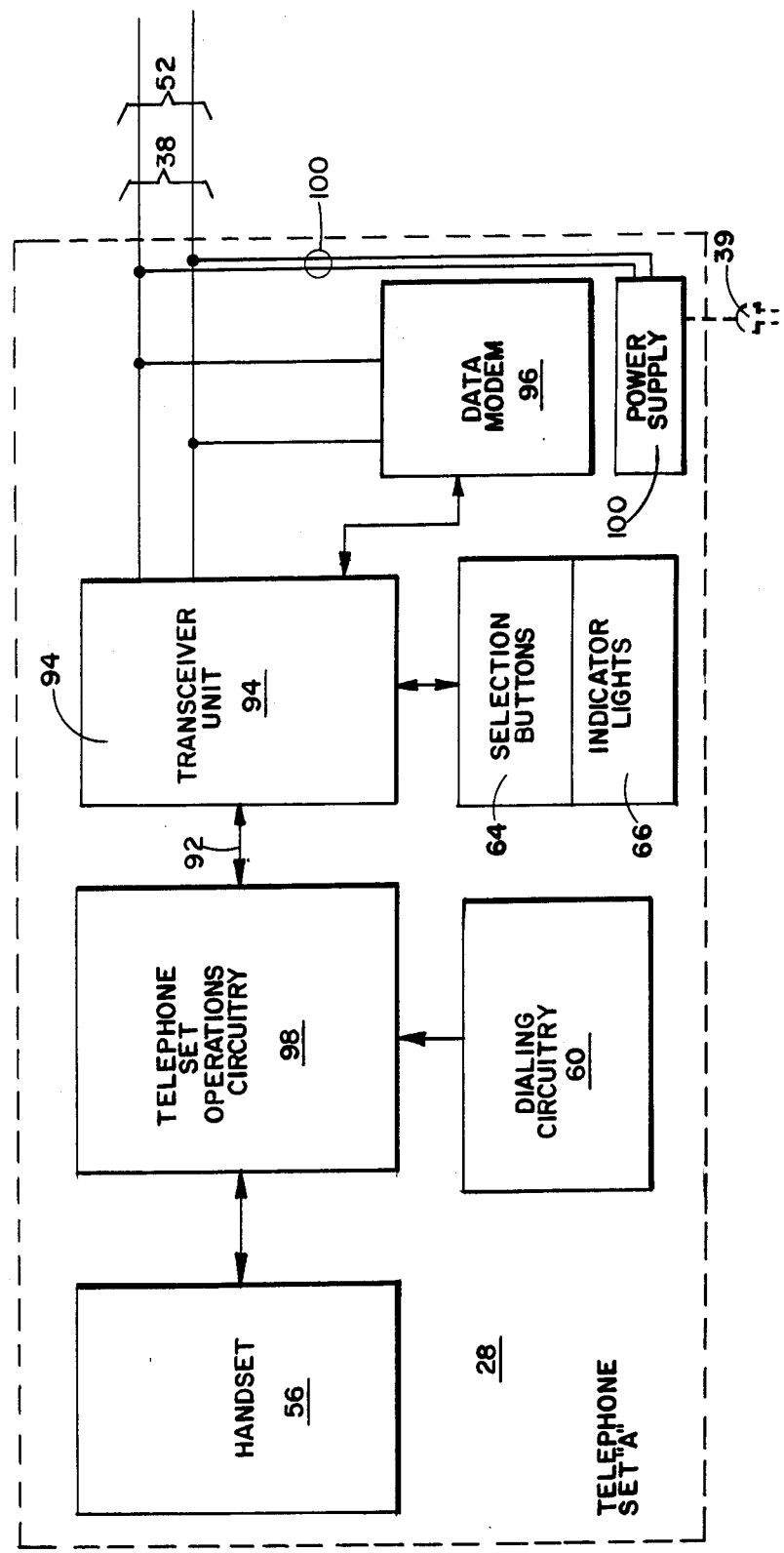
FIG. 3 is a block diagram of the electrical circuitry of a telephone set of this invention.

Referring next to FIG. 3, a block diagram for the telephone set 28 (labeled A) is shown as representative of each of the plurality of telephone sets A-E shown in FIG. 1. The telephone set 28 includes a transceiver unit 94 and a data modem 96 coupled to the interconnection cable 52. The function of the data modem 96 is to detect polling and control signals received on the interconnection cable 52 (or 38 as connected to unit 28) from the line adapter unit 22. Another function of the data modem 96 is to respond to the received polling signals by producing status signals onto the interconnection cable 52. The function of the transceiver unit 94 is to modulate and demodulate frequency multiplexed signals onto and from the interconnection cable pair 52. The transceiver unit 94 operates in cooperation with the data modem 96 so that the status signals produced by the modem 96 reflect the status of the transceiver 94, and so that the frequency of operation and operating mode of the transceiver 94 is set by the modem 96 in response to control signals received on the cable pair 52 from the line adapter unit 22.

The transceiver unit 94 is coupled to the selection buttons 64 and the indicator lights 66. The buttons 64 and lights 66 are for use by the user of the telephone set 28 in order to control the operation of the set 28 and to determine the status of the set 28. For example, the buttons 64 and lights 66 may be used to place a call on hold, to determine which of the subscriber lines 48 or 50 is in use, and to select an intercom call.

The transceiver unit 94 is connected to telephone set operations circuitry 98 through bidirectional link 92. Circuitry 98 is also coupled to the handset 56 and dialing circuitry 60. The function of the circuitry 98 is to send and receive voice signals from the hand set 56 and to detect when the hand set 56 is off-hook. The circuitry 98 also responds to dialing commands which the user provides through the dialing circuitry 60. The operations circuitry 98 also provides ringing for the telephone set 28 when appropriate control signals are received by the transceiver unit 94 through the data modem 96.

The telephone set 28 also includes an internal power supply tap 100 for providing electrical power to the various circuits inside the set 28. The power supply tap 100 is normally coupled through the interconnection cabling 52 to a source of power originated from the line adapter unit 22. Optionally, the power supply can receive power from a wall plug or the like through a standard line cord such as shown by indicator 39. The preferred method of providing electrical power through the interconnection cabling 52 to the set 28 is advantageous in avoiding cumbersome external power cables, plugs, etc.

Figure 4:
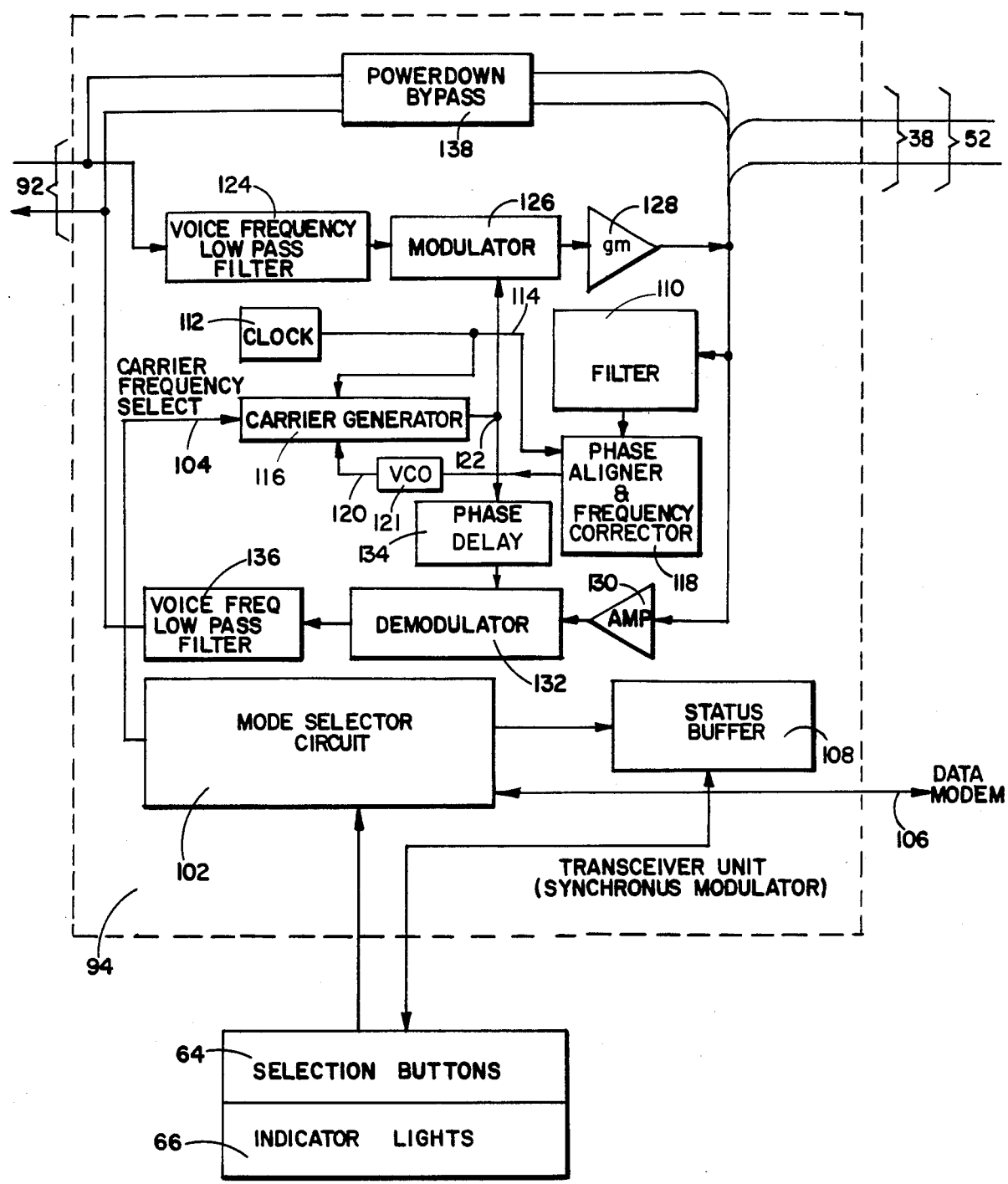
FIG. 4 is a block diagram of one embodiment of the transceiver unit shown in FIG. 3 using a synchronous modulation and demodulation technique

Referring next to FIG. 4, the embodiment of the transceiver unit 94 which uses synchronous modulation and demodulation techniques is shown. The transceiver unit 94 includes a mode selector circuit 102 which produces a carrier frequency select signal on the line 104 in order to control the carrier frequency used for the transmission and reception of signals by the telephone set 28 on the interconnection cable 52. The mode selector circuit 102 is responsive to control signals received on the line 106 from the data modem 96. The control signals presented on the line 106 are produced by the modem 96 in response to control signals produced on the interconnection cable 52 by the line adapter unit 22 (see FIG. 2). The mode selector circuit 102 is coupled to the status buffer 108, the selection buttons 64, and the indicator lights 66, so that the user of the telephone set 28 may control the operation of the telephone set 28 and may visually determine the status of the telephone set 28:

The transceiver unit 94 includes a pilot signal bandpass filter 110 which is coupled to the interconnection pair 52 for the purpose of intercepting the pilot reference signal produced on the interconnection cable 52 by the line adapter unit 22. The transceiver unit 94 also includes a clock generator 12 which generates a clock signal on line 114 for application to phase detector and low pass filter 118. The phase detector and low pass filter 118 also receives input signals from the bandpass filter 110 and returns a feedback signal through a voltage controlled oscillator 121 on a line 120 to the carrier generator 116. The carrier generator 116 supplies output signals to the modulator 126 as well as phase delay 134 via a lead 122.

As will be realized, the signal supplied by phase detector and low pass filter 118 to VCO 121 is used to control the frequency of VCO 121 such that the clock signal generated by carrier generator 116 on lead 122 is in phase synchronism with the pilot reference signal intercepted by bandpass filter 110 as input to the transceiver 94. Overall, the phase detector and low pass filter 118 insures that the transceiver unit 94 operates in synchronism with the pilot reference signal on the cable pair 52, and thus insures that the telephone set 28 is synchronized (in frequency and phase) to all of the other telephone sets of the system 10 and to the line adapter unit 22.

The function of the carrier generator 116 is to produce a carrier signal on the line 122 of the desired frequency. The carrier generator 116 operates as a frequency divider which divides the clock signal provided on the line 120 in accordance with the control signal presented on the line 104 so that the desired sub-multiple of the frequency from the line 114 is produced on the line 122.

Voice signals produced by the user of the telephone set 28 are passed along from the handset 56 (see FIG. 3) through the interconnecting link 92 to a voice frequency low pass filter 124 to bandlimit voice signal entering the frequency division multiplexed (FDM) modulator 126. The bandlimiting reduces adjacent channel signal interference which could occur after modulation. The modulator 126 modulates the carrier signal as received on the line 122 with the voice signals received from the filter 124 and passes the resultant modulated carrier (amplitude modulated double side band, suppressed carrier) through a transconductance (gm) amplifier 128 onto the interconnection cable 52.

The transconductance amplifier 128 is constructed as a voltage controlled current amplifier, such that it provides a modulated current output signal to drive the load impedance 53 on the interconnection cable 52. The use of the transconductance amplifier 128 rather than a more conventional controlled voltage output amplifier allows the combining of more than one output signal of the same frequency on the interconnection pair 52; that is, the use of transconductance amplifiers (such as transconductance amplifier 128) allows a plurality of current signals from different transconductance amplifiers to be superimposed, one upon the other, so that the resultant voltage produced on the interconnection cable 52 will have a voltage envelope which is the summation of each current signal produced by each transconductance amplifier (such as amplifier 128) multiplied by the impedance of block 53.

An amplifier 130 is coupled to the interconnection cable 52 for amplifying the voltage signals received therefrom. A frequency division multiplexed demodulator 132 is provided for demodulating the amplified signal received from the amplifier 130. The demodulator 132 is coupled to the carrier frequency line 122 through a phase delay or phase equalizer 134. The function of the phase delay 134 is to provide a phase offset to the carrier signal from the carrier generator 116 in order to compensate for the phase delay that the modulated signal will experience while traveling down the interconnecting cable 52. Preferably, the phase delay 134 provides a constant time delay to the signal from the carrier generator 116 so that the demodulator 132 operates in approximate phase synchronism with carrier signals received on the cable 52.

A voice frequency low pass filter 136 filters the demodulated output produced by the demodulator 132 in order to produce a voice frequency signal which is passed along the link 92 for reception through the handset 56 (see FIG. 3) by the user of the telephone set 28.

Figure 5:
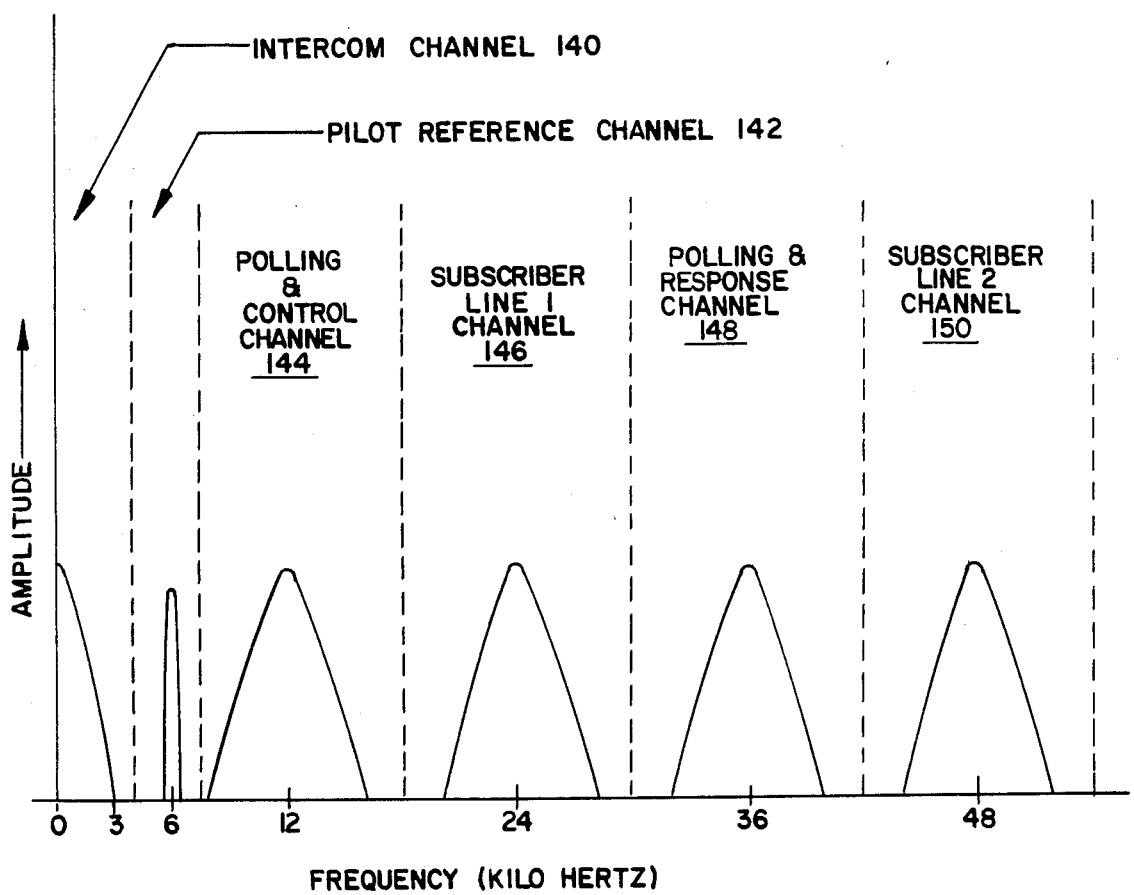
FIG. 5 is a frequency spectrum allocation chart which shows amplitude versus frequency and which illustrates the allocation of frequency channels for use with the embodiment of FIG. 4.

Referring next to FIG. 5, the signal spectrum used on the interconnection cable 52 is split up into a plurality of channels or frequency bands which allow the telephone sets A-E and the line adapter unit 22 to exchange information. In one embodiment, an intercom channel 140 extends between 0 and 3 Kilohertz and allows for intercom conversations between the telephone sets A-E. A pilot reference channel 142 is centered on 6 Kilohertz and allows a pilot reference frequency signal to be transmitted from the line adapter unit 22 to each of the telephone sets A-E so that each of the telephone sets A-E remains in phase and frequency synchronism with each other and with the line adapter unit 22.

A polling and control channel 144 is centered on 12 Kilohertz and is used by the line adapter unit 22 for transmitting control information to each of the telephone sets A-E and for transmitting polling requests to the telephone sets A-E. A subscriber line 1 channel 146 is centered at 24 Kilohertz and allows for the interchange of signals between the subscriber line 48 and any of the telephone sets A-E. A polling and response channel 148 is centered at 36 Kilohertz and is used by each of the telephone sets A-E in order to respond to polling requests received on the channel 144, so that status information from each of the telephone sets A-E may be provided over the channel 148 to the line adapter unit 22. The subscriber line 2 channel 150 is centered at 48 Kilohertz and provides for the exchange of communication between the subscriber line 50 and the telephone sets A-E.

Figure 6:
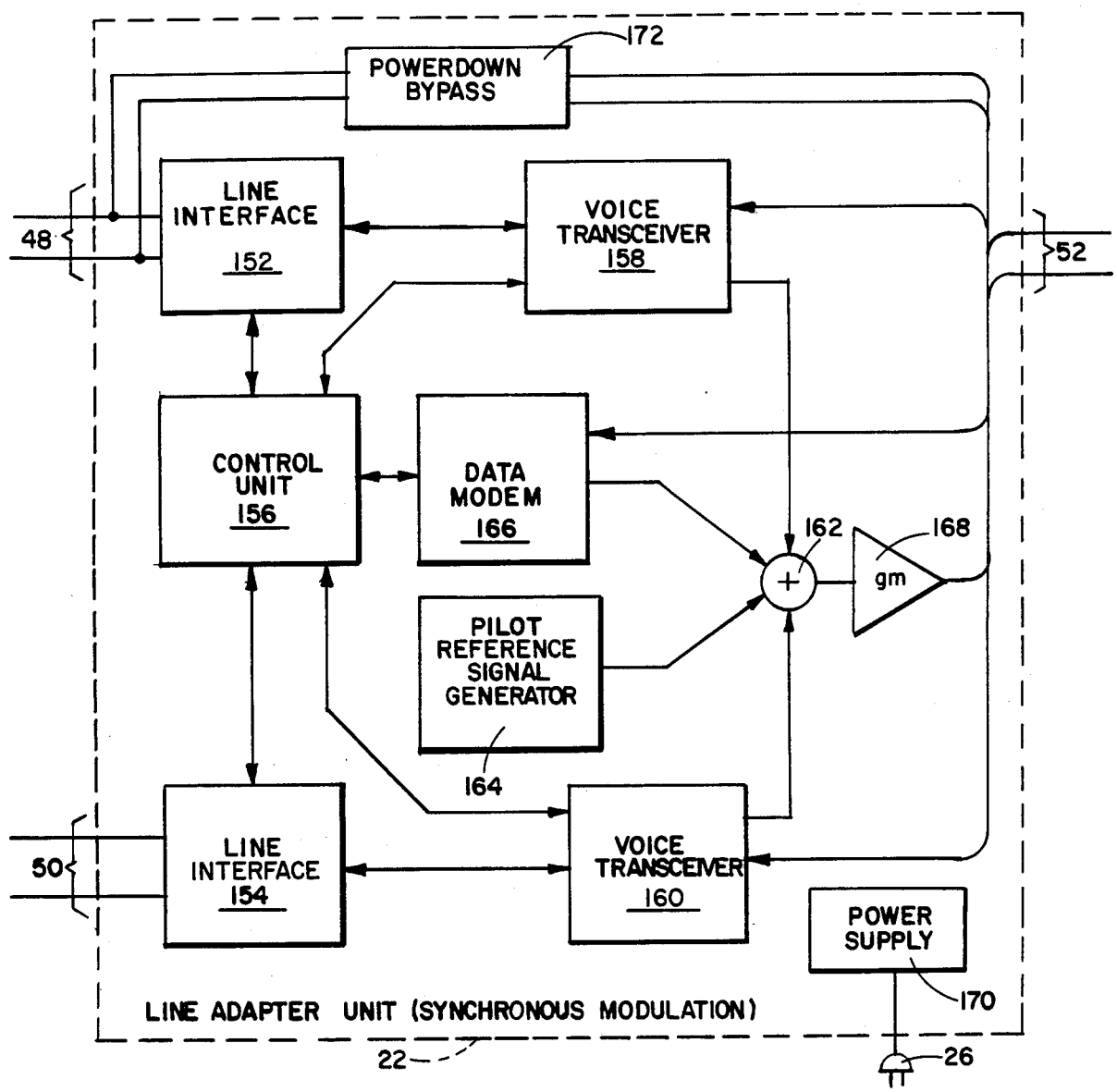
FIG. 6 is a block diagram of the electrical circuitry of the line adapter unit shown in FIG. 2, in which an embodiment using synchronous modulation is shown.

Referring next to FIG. 6, an embodiment of the line adapter unit 22 is shown in which synchronous modulation and demodulation is featured for use with telephone sets having transceiver units 94 of the type shown in FIG. 4. The line adapter unit 22 includes the line interfaces 152 and 154 which are coupled to the subscriber lines 48 and 50, respectively. The function of the line interfaces 152 and 154 is to electrically buffer the lines 48 and 50 from the circuitry of the adapter unit 22. The line interfaces 152 and 154 also provide conventional hook switch and ringing control features. The line interfaces 152 and 154 operate under the control of the control unit 156 and exchange voice signals with the voice transceivers 158 and 160, respectively. The voice transceivers 158 and 160 are constructed similarly to the transceiver unit 94 of FIG. 4 and provide modulated carrier outputs which are arithmetically summed at a summing point 162. The voice transceivers 158 and 160 also include frequency multiplexed inputs from the interconnection pair 52 for receiving signals produced by telephone sets A-E. The transceivers 158 and 160 operate under the control of the control unit 156 so that the carrier frequency used by each of the transceivers 158 and 160 is selected. The transceivers 158 and 160 are normally operated by the control unit 156 to produce carrier frequencies in the channels 146 and 150, respectively, as shown in FIG. 5.

A pilot reference signal generator 164 has an output which is connected to the summation point 162 so that a pilot reference frequency signal is produced on the cable pair 52, in the frequency channel 142 as shown in FIG. 5. The reference signal produced by generator 164 is the signal which is intercepted by the filter 110 of the transceiver unit 94 in order to insure that each telephone set (such as Set A) remains in phase and frequency synchronization. The idea of phase and frequency synchronization made possible by the generator 164 is that the various carriers produced by telephone sets A-E and the line adapter unit 22 can be controlled to be exact multiples of the pilot reference frequency (channel 142 of FIG. 5) and can be phase locked to the pilot reference frequency signal The data modem 166 is a part of the line adapter unit 22 that produces an output signal to the summation point 162 which utilizes the polling and control channel 144, as shown in FIG. 5. The data modem 166 also has an input from the cable pair 52 for receiving signals in the frequency polling response channel 148, which contains the polling responses produced the telephone sets A–E on the interconnection cable 52. The data modem 166 is also coupled to the control unit 156 so that the control unit 156 may issue control commands to each of the telephone sets A–E by initiating appropriate control signals through the data modem 166. The control unit 156 also receives status information from each of the telephone sets A–E through the data modem 166 by issuing the appropriate polling commands.

A transconductance or gm amplifier 168 has its input coupled to the summation point 162 and produces an output on the interconnection cable 52.

A power supply 170 is included in the line adapter unit 22 in order to provide electrical power for the circuitry included therein. The power supply 170 is connected to receive power through a power plug 26 from a conventional source of electrical power, such as the standard alternating current power supplied inside residential houses.

Power down bypass circuitry 172 is provided between the subscriber line pair 48 and the interconnection cable pair 52 so that upon loss of electrical power at the plug 26, the bypass circuitry 172 will directly connect the line pair 48 to the interconnection cable pair 52. The bypass circuity 172 insures that the telephone system 10 will operate as a conventional telephone system coupled to the subscriber line 48 during times when electrical power outages occur. The power down bypass circuitry 172 preferably includes an electromechanical relay which is held open during the time that the power supply 170 is active, and which closes upon loss of electrical power from the power supply 170. Note that the individual telephone sets A–E are equipped with similar bypass circuitry, such as the bypass circuitry 138 shown in FIG. 4. Such bypass circuitry allows the telephone system 10 to operate as a conventional telephone system during times of electrical power outages.

OPERATION OF THE PREFERRED EMBODIMENT

The telephone system 10 controls the placement of incoming and outgoing calls on the subscriber lines 48 and 50, controls the ringing of telephone sets A–E, controls which of the sets A–E are connected to the subscriber lines 48 and 50, and controls the placement of intercom calls between the telephone sets A–E. For example, an incoming call on the subscriber line 48 will be received by the line adapter unit 22 which will use its control unit 156 (acting through its data modem 166) to produce appropriate control signals for ringing on the interconnection cable 52 using the polling and control channel 144. Such ringing signals will cause the appropriate telephone sets A–E to ring. When one of these sets A–E is answered by a user, that set produces an "off hook" indication in the polling and response channel 148 which is then detected by the control unit 156 (received through the data modem 166) of the line adapter unit 22. The control unit 156 then assigns an appropriate frequency channel (such as 146 or 150) for the conversation by controlling the frequency of operation of the voice transceiver 158 and also by sending appropriate control signals through the data modem 166 onto the cable 52 in the control channel 144 in order to adjust the frequency of operation for the transceiver unit 94 in the telephone set which is answering the call. The call then continues until the telephone set in use is "hung up", at which time an "on hook" indication is sent as a signal by that telephone set in the response channel 148 on the interconnection cable 52. This "on hook" indication is detected by the line adapter unit 22 in order to free up future usage of the subscriber line 48 and the telephone set just used.

An intercom call may be set up, for example between telephone sets A and D, by a user at set A. Telephone set A is operated to produce a control signal in the channel 148 on the cable 52 in order to signal the line adapter unit 22 that an intercom call with telephone set D is desired. The line adapter unit 22 responds to the intercom request by sending a ring signal in the channel 144 to the telephone set D and by assigning a common frequency channel to both the telephone set A and telephone set D after the telephone set D is answered. The line adapter unit 22 detects any "on hook" indications received in the channel 148 from either telephone set A or D in order to terminate the intercom channel assignment to those telephone sets.

Various modifications may be made to the embodiments of the invention shown herein without departing from the spirit and scope of the appended claims. For example, rather than using a polling system in order to collect status information from each of the telephone sets A–E, each of the telephone sets may be allocated an individual frequency channel for sending status information, or a common frequency channel can be time shared between the telephone sets A–E with each set being allotted a time slot for sending status information. As may be realized by the discussion thus far, the term "control" refers to actions or signals from the line adapter unit 22 to the telephone set whereas the term "response" is used to delineate actions or signals from the telephone set to the line adapter unit 22.

As will be realized, there are various modifications which may be made to the system illustrated and still be within the inventive concept. One modification is the combination of channels 144 and 148 in a single bidirectional channel using quadrature modulation techniques such as quadrature phase shift keying to allow both control and response in one channel. Thus, the other remaining channels of those shown may be used as a third voice channel with the frequency allocations for the total system remaining as shown.

Single sideband or vestigial sideband modulation and demodulation techniques may be used rather than the double sideband technique of the preferred embodiment. Another possible variation is the use of unsuppressed carrier signals allowing envelope detection by receivers in the telephone sets A–E and the line adapter unit 22.

Although not shown specifically, as will be obvious to one skilled in the art, the FDM transmitter and receiver are a four-wire circuit whereas the modulated signal on the interconnection cable is a two-wire circuit and the typical subscriber line is a two-wire circuit. Therefore, standard techniques such as hybrids or echo cancellors may be employed to reduce echos or undesirable return signals at the four-were, two-wire interfaces.

Although the bandpass filter 110 of FIG. 4 was used in a first embodiment, it may be more desirable to use a demodulator for a phase detector that would not require the bandpass filter.

In view of the above, we wish to be limited, not by the drawdngs, but only by the scope of the appended claims wherein:

What is claimed is:

1. A frequency division multiplexed telephone system for connection to a subscriber telephone line, said system comprising:
   a common conductor cable;
   a line adapter unit for coupling said common conductor cable to said subscriber telephone line, and having a pilot tone generator for producing a pilot tone signal on said common conductor cable; and
   a plurality of telephone sets coupled to said cable for producing frequency division multiplexed signals on said cable, each of said telephone sets including:
   a clock for producing a clock signal having a clock frequency;
   a frequency divider coupled to said clock for dividing said clock signal to produce a digital carrier signal having a frequency that is a sub-multiple of said clock frequency;
   a phase detector coupled to said cable for detecting the phase of said pilot tone signal;
   a controller connecting said frequency divider to said phase detector for causing said frequency divider to generate said carrier signal in phase with said pilot tone signal; and
   a modulator coupled to said common conductor cable and to said frequency divider for modulating a voice signal onto said carrier signal.

2. The frequency division multiplexed telephone system of claim 1, wherein each of said telephone sets additionally includes a demodulator coupled to said common conductor cable and to the output of said frequency divider for demodulating signals received from said cable.

3. The frequency division multiplexed telephone system of claim 2, wherein each of said telephone sets additionally includes a phase delay coupled between the output of said frequency divider and said demodulator for phase-delaying said digital carrier signal amount corresponding to the phase delay experienced by a signal propagating along said common conductor cable.

4. The frequency division multiplexed telephone system of claim 1, wherein each of said telephone sets additionally includes a mode selector coupled to said frequency divider for setting the frequency of said digital carrier signal.

5. A frequency division multiplexed telephone system for connection to a subscriber telephone line, the system comprising:
   a common conductor cable;
   a line adapter unit for coupling said common conductor cable to said subscriber telephone line, and having a pilot tone signal generator for producing a pilot tone on said common conductor cable; and
   a plurality of telephone sets coupled to said cable for producing frequency division multiplexed signals on said cable, each of said telephone sets including:
   a phase detector coupled to said cable for detecting the phase of said pilot tone signal;
   a clock for producing a clock signal having a clock frequency;
   a carrier generator connected to said clock for dividing said clock signal to produce a carrier signal having a frequency that is a sub-multiple of said clock frequency;
   a voltage-controlled oscillator connecting said carrier generator to said phase detector so that the carrier signal developed by said carrier signal generator is in phase synchronism with said pilot tone signal;
   a modulator coupled to said carrier generator for modulating a voice signal onto said carrier signal;
   a phase delay coupled to said carrier generator for phase-delaying said carrier signal an amount corresponding to the phase delay experienced by a signal propagating along said common conductor cable; and
   a demodulator coupled to said common conductor cable and to the output of said phase delay for demodulating signals received from said cable.

6. A frequency division multiplexed telephone system for connection to a subscriber telephone line, said system comprising:
   a common conductor cable;
   a line adapter unit for coupling said common conductor cable to said subscriber telephone line, and having a pilot tone generator for producing a pilot tone signal on said common conductor cable; and
   a plurality of telephone sets coupled to said cable for producing frequency division multiplexed signals on said cable, each of said telephone sets including:
   a pilot tone receiver for detecting said pilot tone on said common conductor cable and for supplying a local reference signal in accordance therewith;
   a carrier signal generator responsive to a clock signal for generating a carrier signal having a frequency that is a sub-multiple of the frequency of said clock signal, and responsive to said local reference signal so that said carrier signal is in phase synchronism with said pilot tone signal;
   a handset;
   a modulator connected to said carrier signal generator, to said common conductor cable, and to said handset for modulating voice signals from said handset onto said carrier signal and transmitting the modulated signal to said cable; and
   a demodulator connected to said handset, to said common conductor cable, and to said carrier signal generator for demodulating signals received from said common conductor cable into voice signals and transmitting said voice signals to said handset.

7. The frequency division multiplexed telephone system of claim 6, wherein each of said telephone sets additionally comprises a voice frequency low-pass filter connected to the input of said modulator for bandlimiting voice signals input to said modulator.

8. A frequency division multiplexed telephone system for connection to a subscriber telephone line, said system comprising:
   a common conductor cable;
   a line adapter unit for coupling said common conductor cable to said subscriber telephone line, and having a pilot tone generator for producing a pilot tone signal on said common conductor cable; and
   a plurality of telephone sets coupled to said cable for producing frequency division multiplexed signals on said cable, each of said telephone sets including:
   a clock for producing a clock signal having a clock frequency;
   a pilot signal bandpass filter coupled to said common conductor cable for passing said pilot tone signal;

a phase detector coupled to the output of said pilot signal bandpass filter for detecting the phase of said pilot tone signal;

a carrier generator connected to said clock for dividing said clock signal to produce a digital carrier signal having a frequency that is a sub-multiple of said clock frequency;

a modulator coupled to the output of said carrier generator for modulating a voice signal onto said carrier signal;

a voltage-controlled oscillator connecting said phase detector to said carrier generator so that said carrier generator generates said carrier signal in phase synchronism with said pilot tone signal;

carrier frequency select means connected to said carrier generator for setting the frequency of said carrier signal generated by said carrier generator;

a phase delay coupled to the output of said carrier generator for phase-delaying said carrier signal an amount corresponding to the phase delay experienced by a signal propagating along said common conductor cable;

a demodulator coupled to said common conductor cable and to the output of said phase delay for demodulating signals received from said cable;

a handset;

a first voice frequency low-pass filter connected between said handset and said modulator for bandlimiting voice signals received from said handset; and a second voice frequency low-pass filter connected between the output of said demodulator and said handset for filtering voice signals transmitted from said demodulator to said handset.

9. A telephone set for use with other like sets in a local frequency division multiplexed telephone system for connection to public telephone lines, the telephone set comprising:

a connection for connecting said telephone set into said local system;

a pilot tone receiver for detecting a pilot tone signal received at said connection and for supplying a local reference signal in accordance therewith;

a carrier signal generator responsive to a clock signal for developing a carrier signal having a frequency that is a sub-multiple of the frequency of said clock signal, and responsive to said local reference signal so that said carrier signal is in phase synchronism with said received pilot tone signal;

a handset;

a modulator coupled to said handset and to said connection for modulating voice signals from said handset onto said carrier signal and applying said modulated carrier signal to said connection; and a demodulator coupled to said connection, to said handset, and to said carrier signal generator for demodulating signals received at said connection in phase sychronism with said received pilot tone signal.

10. The telephone set of claim 9, additionally comprising a phase delay coupled between the output of said carrier signal generator and said demodulator for phase-delaying said carrier signal an amount corresponding to the phase delay experienced by a signal propagating through said local telephone system.

11. The telephone set of claim 10, additionally comprising a mode selector coupled to said carrier generator for setting the frequency of said carrier signal.

12. The telephone set of claim 9, additionally comprising a voice frequency low-pass filter connected between said handset and said modulator for bandlimiting voice signals from said handset.

13. A telephone set for use with other like sets in a local frequency division multiplexed telephone system for connection to public telephone lines, the telephone set comprising:

a connection for connecting aid telephone set into said system;

a phase detector coupled to said connection for detecting the phase of a pilot tone signal received at said connection;

a clock for producing a clock signal having a clock frequency;

a carrier generator connected to said clock for dividing said clock signal to produce a carrier signal having a frequency that is a sub-multiple of said clock frequency;

a modulator coupled to the output of said carrier generator for modulating a voice signal onto said carrier signal;

a voltage-controlled oscillator connecting said carrier generator to said phase detector so that said carrier signal developed by said carrier generator is in phase synchronism with said received pilot tone signal;

a phase delay coupled to the output of said carrier generator for phase-delaying said carrier signal an amount corresponding to the phase delay experienced by a signal propagating in the system; and a demodulator coupled to said connection and to the output of said phase delay for demodulating a signal received at said connection.

14. The telephone set of claim 13, additionally comprising:

a handset;

a first voice frequency low-pass filter connected between said handset and said modulator for bandlimiting voice signals received from said handset; and a second voice frequency low-pass filter connected between the output of said demodulator and sand handset for filtering voice signals transmitted from said demodulator to said handset.

15. The telephone set of claim 14, additionally comprising a pilot signal bandpass filter coupled between said connection and said phase detector for passing said pilot tone signal.

16. The telephone set of claim 13 additionally comprising carrier frequency selection means connected to said carrier signal generator for setting the frequency of said carrier signal.

* * * * *